Figure 1:
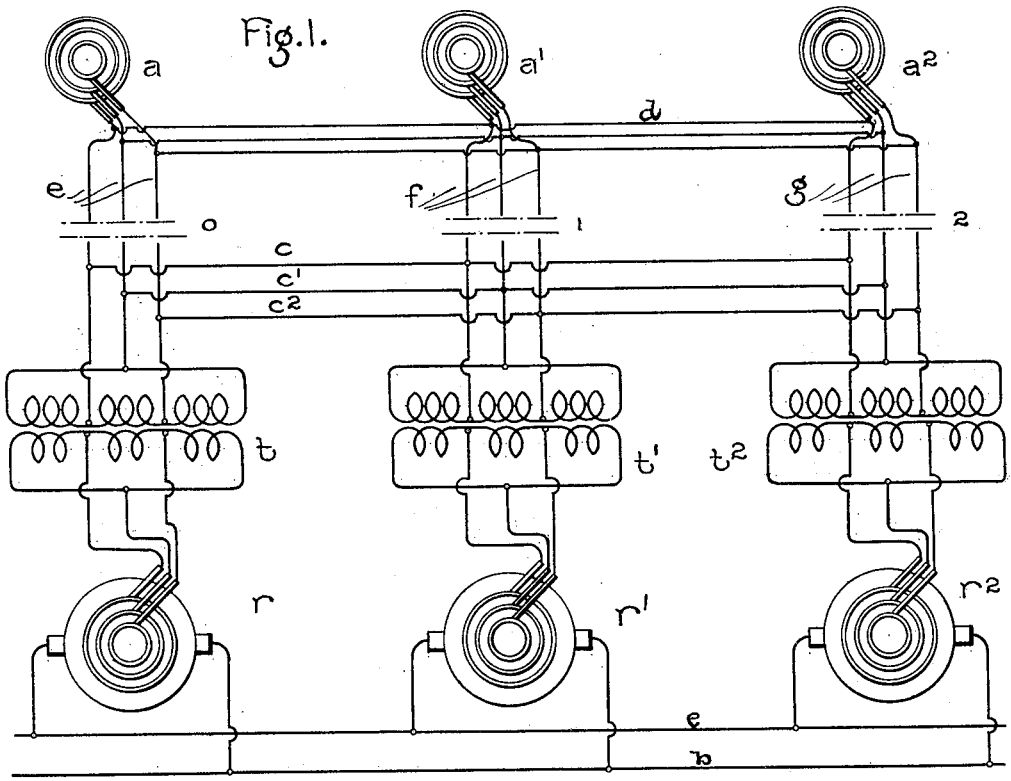

No. 660,483. Patented Oct. 23, 1900.
E. J. BERG.
TRANSMISSION OF POWER.
(Application filed Aug. 16, 1899.)
(No Model.)

Witnesses.
Edward Williams, Jr.
B. B. Hull

Inventor:
Ernst J. Berg.
by Albert G. Davis
Atty.

THE NORRIS PETERS CO., PHOTO-LITHO., WASHINGTON, D. C.

UNITED STATES PATENT OFFICE.

ERNST J. BERG, OF SCHENECTADY, NEW YORK, ASSIGNOR TO THE GENERAL ELECTRIC COMPANY, OF NEW YORK.

TRANSMISSION OF POWER.

SPECIFICATION forming part of Letters Patent No. 660,483, dated October 23, 1900.

Application filed August 16, 1899. Serial No. 727,368. (No model.)

*To all whom it may concern:*

Be it known that I, ERNST J. BERG, a citizen of the United States, residing at Schenectady, county of Schenectady, State of New York, have invented certain new and useful Improvements in Transmission of Power, (Case No. 948,) of which the following is a specification.

Where a number of rotary converters or synchronous motors are fed from the same distribution system, it frequently happens that the machines set each other hunting by interaction among themselves, and this effect is the more pronounced if the natural periods of oscillation of the machines are approximately the same, as would ordinarily be the case if the machines were of equal size and capacity. My invention aims to prevent this result; but before proceeding to describe the same I will, as a preliminary, first briefly state the manner in which the converters or other machines are caused to hunt by reason of their interconnection in the same distribution system.

Let it be supposed that a plurality of rotary converters or the like are being fed from a single distribution system and that one of the machines is thrown forward from its neutral position by reason of some such cause as a change of load taken together with a difference in the magnetic sluggishness of the machines. As soon as the machine is displaced from its neutral position a resultant electromotive force is produced approximately in quadrature with its counter electromotive force. By reason of the self-induction of the machine the resultant current lags behind the resultant electromotive force and is thus brought partially into phase with the counter electromotive force of the machine, thus increasing the counter electromotive force, and consequently increasing the electromotive force at the terminals of the machine. If the generating system is not infinitely large in comparison with the capacity of the converter, the shifting in phase of the resultant current reacts upon and increases the electromotive force of the generator, which increased electromotive force is consequently impressed upon the other machines in the system. Since an acceleration of the converter-armature causes its counter electromotive force to rise beyond the impressed, it follows that the reverse operation—namely, an increase of the impressed above the counter electromotive force—will cause the converter-armature to slip back. Consequently when one converter-armature is thrown forward it reacts through the generating source to cause the armatures of other machines on the same system to be retarded or thrown back. The hunting of one converter thus tends to cause all the other converters in the same system to hunt. This result may be accumulative if the machines have resonating periods of oscillation. As soon, however, as the converters or other machines in the system begin to hunt another action takes place. When two or more machines are displaced in opposite directions from their neutral position, their electromotive forces no longer balance each other, and a resultant electromotive force is produced approximately in quadrature with its components. This resultant electromotive force causes current to flow between the two machines, the current acting to pull the machines into step by causing an opposing torque in one machine as it moves away from its neutral position in one direction and a similar resisting torque in another machine or machines oscillating in the opposite direction from their neutral positions. This torque takes place by reason of the fact that the current flowing between the machines is partially in phase with the electromotive forces of the machines. This, however, can only take place if the self-induction of the circuit between the machines is large in comparison with its resistance, thereby causing a considerable lag of current behind the resultant electromotive force. If therefore the lines connecting the machine are of comparatively high resistance, the synchronizing power is very low, and the tendency of the converters to set each other hunting becomes very marked. I have discovered that if the alternating-current terminals of the rotary converters or synchronous motors fed from a single distribution system are connected together by circuits of low resistance or at least by circuits in which there is only a small ohmic loss the synchronizing power available will be so far increased as to greatly reduce or entirely prevent hunting among the different machines. Moreover, the electromotive forces of the machines will by these connections be so far equalized as to remove the cause of the aggravated hunting due to the shifting of load from one machine to another as the voltages of the machines are varied by oscillations of the armatures in the manner above described.

The scope of my invention is to be determined by reference to the claims appended to this specification, while for a better understanding of the nature and mode of operation of my invention reference is to be made to the following description, taken in connection with the accompanying drawings, in which—

Figure 2:
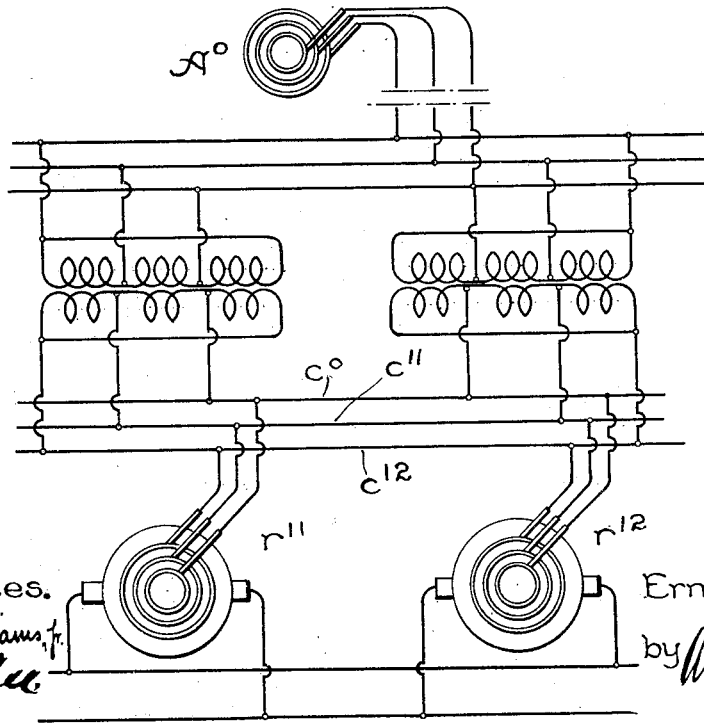

Figure 1 shows a generating system composed of a plurality of generators feeding a plurality of rotary converters. Fig. 2 shows a plurality of rotary converters fed from a single generator.

In Fig. 1, $a\,a'\,a^2$ represent three alternating-current generators of the three-phase type, each generator being connected to bus-bars $d$, from which transmission-lines of considerable length are fed. In Fig. 1 the spaces between the sets of dotted lines 0 1 2 represent omitted portions of transmission-lines $e\,f\,g$. At the receiving end of the circuits the transmission-lines are connected in the usual manner to step-down transformers $t\,t'\,t^2$, from the secondaries of which rotary converters $r\,r'\,r^2$ are fed, the direct-current terminals of the converters being connected in multiple to distributing-mains $e\,b$. In order to reduce the hunting tendency of the rotary converters $r\,r'\,r^2$ by equalizing the electromotive forces at their terminals, I provide suitable cross connections—in this case shown as conductors $c\,c'\,c^2$—connecting the corresponding primary terminals of the transformers $t\,t'\,t^2$. The object in making the connections on the high-potential side of the transformers is to reduce the cross-section of the connecting-conductors, and thus make a saving in the amount of copper required. It is not at all essential, however, that the high-potential side of the transformers be connected as shown. On the contrary, the alternating-current terminals of the rotary converters may be directly connected together, as shown in Fig. 2, in which $r^{11}$ and $r^{12}$ represent the converters and $c^0$, $c^{11}$, and $c^{12}$ the cross connections between the terminals of the converters. The arrangement shown in Fig. 2 differs slightly from that shown in Fig. 1 in that a single generator $A^0$ is employed instead of a plurality of generators, the converters or other machines being supplied from transformers fed from alternating mains supplied by transmission-lines from the generator.

In the drawings the direct current sides of all the converters on the same system are shown as connected to the same direct-current-distribution system; but it is not necessary that this connection be made, for it will be obvious that the converters, either singly or in groups, may be used to supply separate loads.

What I claim as new, and desire to secure by Letters Patent of the United States, is—

1. The combination of a plurality of rotary converters, a transformer or transformers for supplying each converter, and conductors connecting together the alternating-current-supply conductors of the converters.

2. The combination of a source of alternating current, a plurality of rotary converters fed through separate transmission-lines running back to said source, conductors connecting together the direct-current terminals of the converters, and conductors connecting together the alternating-current terminals of the converters.

3. The combination of a plurality of rotary converters, conductors connecting together the direct-current terminals of the converters, conductors connecting together the alternating-current terminals of the converters, and separate transmission-lines for supplying alternating current to said converters.

4. The combination of a source of alternating current, a plurality of synchronous machines fed thereby over separate transmission-lines, and circuits of low resistance, connecting together the alternating-current terminals of said machines.

In witness whereof I have hereunto set my hand this 14th day of August, 1899.

ERNST J. BERG.

Witnesses:
BENJAMIN B. HULL,
MABEL E. JACOBSON.